Dec. 23, 1952 W. W. LETTS 2,622,510
PRESSING SAWDUST INTO THE FORM OF BODIES
Filed May 12, 1948
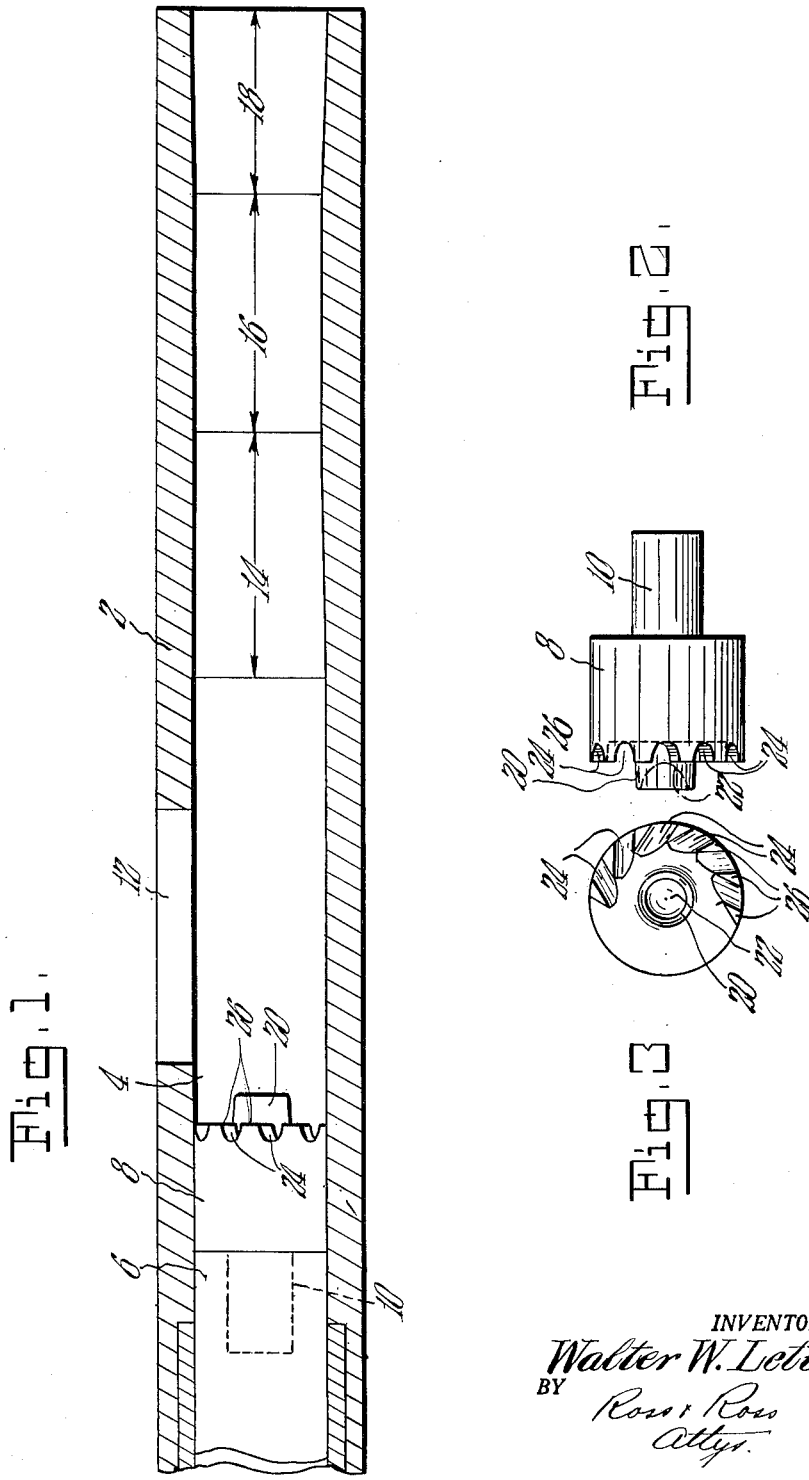
INVENTOR.
Walter W. Letts.
BY Ross & Ross
Attys.

Patented Dec. 23, 1952

2,622,510

UNITED STATES PATENT OFFICE 2,622,510

PRESSING SAWDUST INTO THE FORM OF BODIES

Walter W. Letts, Northville, N. Y.

Application May 12, 1948, Serial No. 26,553

1 Claim. (Cl. 100—98)

My invention relates to improvements in the art of forming bodies from sawdust and is directed more particularly to apparatus for compacting and pressing sawdust to form a solid body.

The principal object of the invention is the provision of an apparatus constructed and arranged to compact and to press successive charges of sawdust into the form of a body.

According to the novel features of the invention, successive charges of dry sawdust may be pressed to form a self sustaining substantially rigid body.

Sawdust is largely a waste material which, according to this invention, may be made use of and formed into elongated bodies. The bodies produced may be of various lengths and diameters and, according to one feature of the invention, may be made to simulate pieces of charcoal, fire-wood, or the like, and not only may be used in the place of fire-wood and charcoal but also may be burned to provide at least as much heat and more frequently more heat than a piece of wood or charcoal of corresponding dimensions.

The bodies produced are solid and are not readily ruptured so that they may be easily stored and shipped. The product provides a clean and convenient method for saving and handling waste sawdust.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a longitudinal sectional elevational view through apparatus embodying the novel features of the invention; and Figs. 2 and 3 are side and elevational views respectively of the plunger head of the apparatus shown in Fig. 1.

Referring now to the drawings more in detail, the invention will be fully described.

A member 2 has a longitudinal bore 4 therethrough which is of special form as will presently be described. The member 2 may take any form desired but, for illustrative purposes, it is shown in the form of a tube.

A plunger 6 is reciprocable back and forth in the bore 4 and may be reciprocated by any suitable means. Such means will be operated at the desired speed and in such a manner as to exert a very considerable pressure in its forward movement toward the right from the position shown in Fig. 1.

A pressure head 8 is provided on the forward end of the plunger and has a shank 10 receivable in a suitable socket provided in the end of the plunger and adapted to be engaged with the reciprocating means.

Member 2 has an opening or openings such as 12 through which a charge of sawdust may be delivered by any desired means.

In the forward stroke of the plunger, the pressure head is moved in the bore 4 to a point to the right of or beyond the opening 12 and it functions in this stroke to advance and to act upon a charge of sawdust which has been previously received through the opening 12 in the tube 2.

Between a distance in the bore represented by 14, the walls of the bore converge slightly, say approximately one sixty-fourth of an inch, in a case where the bore is about one inch or so in diameter. The pressure head, of course, fits the bore in such a manner that it is freely reciprocable but with no unnecessary space therearound.

A length of the bore represented by 16 is straight and a length represented by 18 flares, the taper being similar to the converging portion represented by 14.

The pressure head 8 is provided with a forwardly extending and preferably tapering pilot 20 which has a depression 22 in its forward end.

Grooves 24 are arranged relatively angularly in the forward transverse face of the head 8 forming a plurality of pressure faces 26.

In operation, the plunger is reciprocated back and forth so as to reciprocate the head back and forth and successive charges of sawdust are delivered through the opening 12 forwardly of the head in its rear position.

A charge may represent a quantity equal to the diameter of the bore and one-quarter inch or so in thickness.

The charges are successively forced along the portion 14 of the bore which is such that it offers considerable resistance thereto. The head in its forward movement presses on the charges with great force to force the charges into one another and build up a solid body.

Such force is used that the body is very dense in structure and has an outer glazed surface which is reasonably hard. The end of the body is made glossy or glazed by the end portions of the head and the end of the body has depressions formed by the pilot 10 and pressure faces 26.

As a new charge is forced against the end of the body, the said pilot and the forward parts of the head causes the end face to be ruptured and the new charge to be forced thereinto.

Thus, as the plunger and head are reciprocated, successive charges are forced onto the end of the body which is built up and progressively moved through the portions 14 and 16 of the bore so that a substantially rigid body is provided which emerges from the flared end of the bore.

The body may be of any desired length and the parts may be constructed and arranged to that end.

It has been discovered that the particular form of working face provides a result not heretofore achieved and it is possible to form a body in which the sawdust particles are intimately associated. The body is firm in all respects, it has a smooth hard periphery, is not likely to crumble, and is self sustaining.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim are therefore intended to be embraced therein.

What it is desired to claim and secure by Letters Patent of the United States is:

Apparatus for forming sawdust into solid elongated cylindrical bodies comprising in combination, an elongated unitary body and a pressure head, said body being provided with a longitudinal bore therethrough having an inner inlet portion and an outer discharge outlet portion and provided with entrance opening in radial communication with said inlet portion of the bore, the wall at the inlet portion of the bore being cylindrical and portions thereof to said discharge outlet being successively relatively frusto conical with a progressively decreasing diameter, then cylindrical and finally relatively frusto conical with a progressively increasing diameter, said pressure head being in the form of an elongated member arranged for reciprocation back and forth in the inlet portion of the bore of the body and having a forward end for acting on sawdust in said bore, said end having a partial rim therearound provided with a forward face with a pilot extending forwardly from the plane of said face disposed inwardly of said rim and providing a channel between said rim and pilot, said rim provided with circumferentially spaced grooves extending inwardly from the outer periphery of said pressure head to said channel, said grooves having their axes disposed in planes angularly related to planes extending radially through the longitudinal axis of said pressure head.

WALTER W. LETTS.

REFERENCES CITED

The following references are of record in the file of this patent:

UNITED STATES PATENTS

| Number | Name | Date |
|---|---|---|
| 206,658 | Blossom | Aug. 6, 1878 |
| 226,166 | Fanning | Apr. 6, 1880 |
| 380,185 | Chase | Mar. 27, 1888 |
| 454,112 | DeLoriea | June 16, 1891 |
| 1,372,898 | Nelson | Mar. 29, 1921 |
| 1,450,104 | Merli | Mar. 27, 1923 |
| 1,819,480 | Paxton | Aug. 18, 1931 |
| 1,826,586 | Williams | Oct. 6, 1931 |
| 2,020,843 | Lohner | Nov. 12, 1935 |
| 2,059,486 | Payne | Nov. 3, 1936 |
| 2,097,502 | Southgate | Nov. 2, 1937 |
| 2,205,865 | Schwarzkopf | June 25, 1940 |
| 2,225,424 | Schwarzkopf | Dec. 17, 1940 |
| 2,407,849 | Roth | Sept. 17, 1946 |

FOREIGN PATENTS

| Number | Country | Date |
|---|---|---|
| 424,764 | France | Mar. 21, 1911 |